US008220709B2

(12) United States Patent  (10) Patent No.: US 8,220,709 B2
Gordon et al.  (45) Date of Patent: *Jul. 17, 2012

(54) SYSTEM FOR PROVIDING WEDDING MANAGEMENT

(75) Inventors: Robert E. Gordon, Brussels (BE); Lino G. P. Di Cesare, Brussels (BE)

(73) Assignee: The Knot, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/903,145

(22) Filed: Oct. 12, 2010

(65) Prior Publication Data

US 2011/0029442 A1   Feb. 3, 2011

Related U.S. Application Data

(63) Continuation of application No. 11/368,188, filed on Mar. 3, 2006, now Pat. No. 7,832,633.

(60) Provisional application No. 60/664,180, filed on Mar. 23, 2005.

(51) Int. Cl.
  *G06K 5/00*  (2006.01)
(52) U.S. Cl. ........................................... 235/380
(58) Field of Classification Search .................. 235/379, 235/380, 492; 705/14, 35
  See application file for complete search history.

(56) References Cited

U.S. PATENT DOCUMENTS

| 6,594,640 | B1 | 7/2003 | Postrel |
| 6,842,739 | B2 | 1/2005 | Postrel |
| 6,947,898 | B2 | 9/2005 | Postrel |
| 7,552,866 | B2 | 6/2009 | Ruttenberg et al. |
| 2002/0023009 | A1 | 2/2002 | Ikeda |
| 2002/0128934 | A1 | 9/2002 | Shaer |
| 2002/0188509 | A1 | 12/2002 | Ariff et al. |
| 2003/0130895 | A1 | 7/2003 | Antonucci et al. |
| 2003/0200144 | A1 | 10/2003 | Antonucci et al. |
| 2003/0236704 | A1 | 12/2003 | Antonucci |
| 2004/0078283 | A1 | 4/2004 | Gary |
| 2004/0098351 | A1 | 5/2004 | Duke |
| 2004/0243468 | A1 | 12/2004 | Cohagan et al. |
| 2004/0243498 | A1 | 12/2004 | Duke |
| 2005/0033650 | A1 | 2/2005 | Robertson |
| 2005/0043992 | A1 | 2/2005 | Cohagan et al. |
| 2007/0198402 | A1 | 8/2007 | Ruttenberg et al. |

OTHER PUBLICATIONS

"American Express and the Knot, Inc., Launch Unique Credit Cards Designed Specifically for Engaged Couples and Newlyweds," Dec. 1, 2005, website: http://home3.americanexpress.com/corp/pc/2005/theknot_print.asp, 3 pages.

"The Nest Credit Card from American Express," http://www.thenest.com/amex/nest_amex_home.aspx, 1 page (2006).

(Continued)

*Primary Examiner* — Seung Lee
(74) *Attorney, Agent, or Firm* — Finnegan, Henderson, Farabow, Garrett & Dunner, LLP

(57) ABSTRACT

A system including a terminal; and a network configured to communicatively couple with the terminal, the network including a database configured to store information concerning the user and a wedding card, and a server configured to provide web services that include receiving personal information concerning a user, determining whether to authorize the user based on the personal information, granting a wedding card to the user based on the determination to authorize the user, wherein the wedding card is associated with an upcoming wedding of the user, and providing access to a website for the user, wherein the website provides a wedding management system assisting the user in planning the upcoming wedding.

42 Claims, 6 Drawing Sheets

OTHER PUBLICATIONS

Non-final Office Action for U.S. Appl. No. 11/368,188, mailed Nov. 25, 2008, 6 pages.

Non-final Office Action for U.S. Appl. No. 11/368,188, mailed Apr. 9, 2009, 6 pages.

Non-final Office Action for U.S. Appl. No. 11/368,188, mailed Oct. 28, 2009, 6 pages.

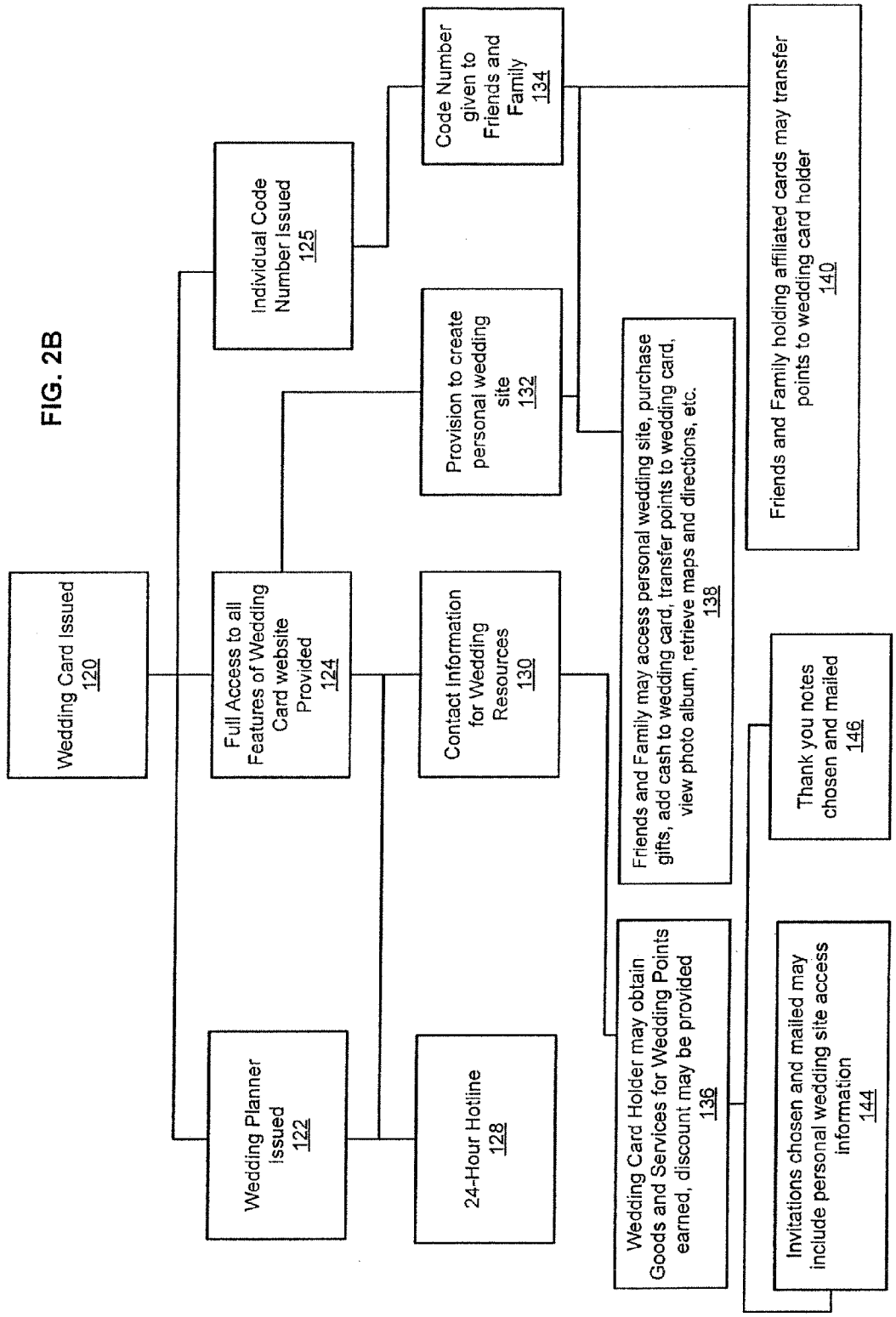

SYSTEM FOR PROVIDING WEDDING MANAGEMENT

CROSS REFERENCE TO RELATED PATENTS

This application is a continuation of application Ser. No. 11/368,188, filed Mar. 3, 2006 now U.S. Pat. No. 7,832,633, "A System for Providing Wedding Management" and claims the benefit of U.S. Provisional Application No. 60/664,180, filed Mar. 23, 2005, "The Wedding Card and System for Providing Wedding Card," both of which are incorporated herein by reference.

FIELD OF THE INVENTION

The present invention relates to a wedding management system for providing services that assist couples and third parties in organizing and planning the couple's wedding.

BACKGROUND INFORMATION

While a wedding day can be a very enjoyable time for a couple, weddings can be very difficult to plan. Couples often have to budget for the wedding, choose members for the wedding party, construct initial guest lists and book reception sites, choose an officiant, and select a ceremony site approximately 10 months before the wedding. Between eight to 10 months before the wedding, couples are encouraged to order the wedding gown, book a florist, a photographer, a band or a DJ, and a videographer, reserve accommodations for out-of-town guests, register for gifts, and book any necessary rentals. Between six to eight months before the wedding, couples are encouraged to order bridesmaids' dresses, plan the honeymoon, book ceremony music, finalize plans with caterer and florist, and send Save the Date cards. Between four to six month before the wedding, couples are encouraged to order the wedding cake, shop for wedding rings and invitations, hire wedding day transportation, and finalize the guest list. Three months before the wedding, couples are encouraged to order the invitations, order the wedding rings, and finalize the men's formal wear. Within two months, couples are encouraged to mail the invitations, write their vows, consult an officiant, buy gifts for their attendants, their parents, and each other, and test-drive their makeup and hair styles. One month before the wedding, couples are encouraged to apply for a marriage license, confirm plans with all vendors, order favors, have final gown fitting, and create the wedding program. Within two weeks before the wedding, couples are encouraged to follow-up on late RSVPs, provide the photographer a must take list, deliver a play list to the band or the DJ, and get their hair colored and/or cut. Within one week before the wedding, couples are encouraged to deliver a final head count, plan a seating chart, print place and table cards, confirm arrangements with vendors, create the wedding day schedule, and arrange post wedding rental returns. With a couple days before the wedding, couples are encouraged to pickup men's formal wear, arrange for transportation, deliver welcome gifts, deliver favors and table cards, determine processional order, and pack wedding day emergency kit. On the day of the wedding the couple is encouraged to establish a contact person for the photographer and reception site manager, give wedding rings to honor attendants, give officiant's fee envelope to best man, and take a moment to thank their parents. After all this has occurred, the couple can finally enjoy their wedding day.

As shown above, this planning can be very strenuous on the couple and their families. What is needed is a website that helps couples manage all of their wedding plans efficiently so that the couples can enjoy the wedding planning process.

BRIEF DESCRIPTION OF THE DRAWINGS

FIGS. 2A and 2B are block diagrams illustrating alternative methods for implementing some embodiments of the present invention;

DESCRIPTION OF THE PREFERRED EMBODIMENTS

Reference will now be made in detail to the exemplary embodiments implemented, the examples of which are illustrated in the accompanying drawings. Wherever possible, the same reference numbers will be used throughout the drawings to refer to the same or like parts.

In this application, credit and debit cards, are collectively referred to herein as "credit/debit cards" and credit providers and debit providers are collectively known as "credit/debit providers." In addition, various embodiments of the present invention are applicable to charge cards and prepaid cards, as well as to credit/debit cards. Thus, in some instances, credit/debit cards, charge cards, and prepaid cards will be referred to collectively as "cards," and the providers thereof as "providers."

Figure 1:
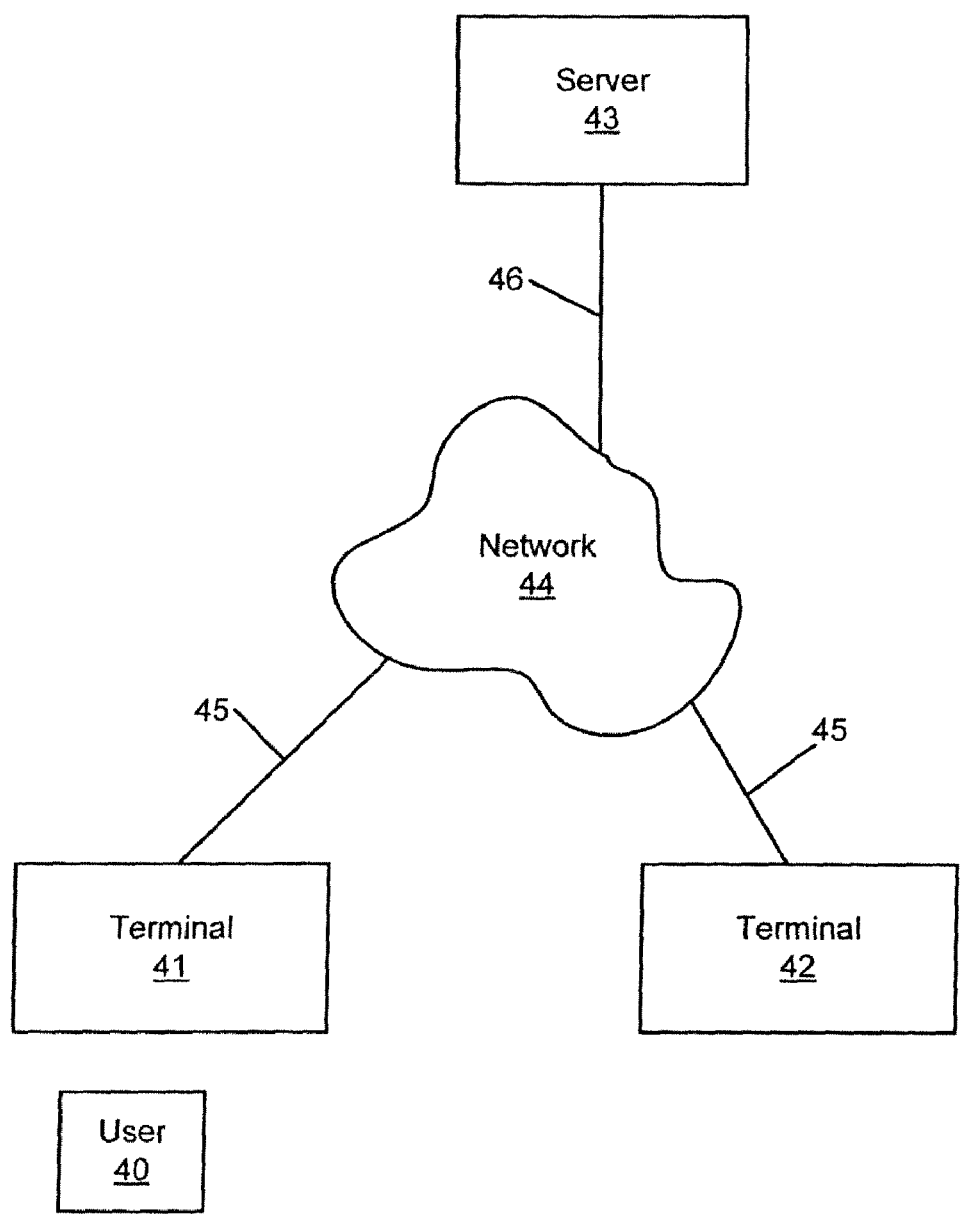
FIG. 1 is a block diagram illustrating an exemplary system and components for implementing some embodiments over a network.

As shown in FIG. 1, management of the wedding card and features associated therewith can be implemented over a network. User 40, such as an applicant, cardholder, or application processor, inputs information via terminal 41. Terminals 41, 42 can be a personal computer (PC), a minicomputer, a mainframe computer, a microcomputer, a telephone device, a personal digital assistant (PDA), or any other device having a processor and input capability.

As further shown in FIG. 1, in some embodiments, the terminal 41 can be coupled to a server 43 via network 44 (e.g. Internet) through couplings 45, 46, (e.g. wired, wireless, and/or fiber optic connections). Server 43 can be a PC, a minicomputer, a mainframe computer, a microcomputer, etc. Server 43 may include a web server for maintaining a wedding card website, as well as all cardholder's personal wedding websites. In some embodiments, server 43 may be linked to servers of all affiliated cards. Further, in some embodiments, server 43 may be a single server or a plurality of servers that provide the wedding management system. The wedding management system has the ability to provide goods and services to the wedding card cardholders, provide a bridal registry, provide a wedding planner to the cardholders, provide a wedding card website that allows a cardholder the ability to create his or her own personalized wedding web pages, and provide any relevant wedding information to the cardholder.

The server 43 may include a data storage device (not shown) or a connection to the data storage device, wherein the data storage device is capable of storing information based, for example, on code numbers (described below) issued to cardholders, wedding card account numbers, and/or any other information relating to the wedding card. For example, the data storage device can be a database or a data repository and the data storage device may store the account holder's personal information, location of the wedding, transactions, guest lists for the wedding, etc. The name and respective address of each person or member of the family invited to the wedding may be saved in a unique record of the data storage device. In addition, a list of all gifts purchased through the wedding card website may be savable in the data storage device along with the name and address of the gift-giver. This information may also be used for other purposes, e.g., direct mailings, etc. As noted, each record preferably includes at least one field for entering a description of gifts given by respective guests. Each record may further include fields indicating whether that guest has donated any credit card reward points, and whether a Thank You Note has yet been sent to the guest. If Thank You Notes are to be created through the wedding card website, this field may be updated automatically. If Thank You Notes are not to be created through the website, the wedding card cardholder may be provided with an option to update the field manually, for example, by checking a check box using an input device such as a mouse, a keyboard, a microphone, or the like.

Figure 2A:
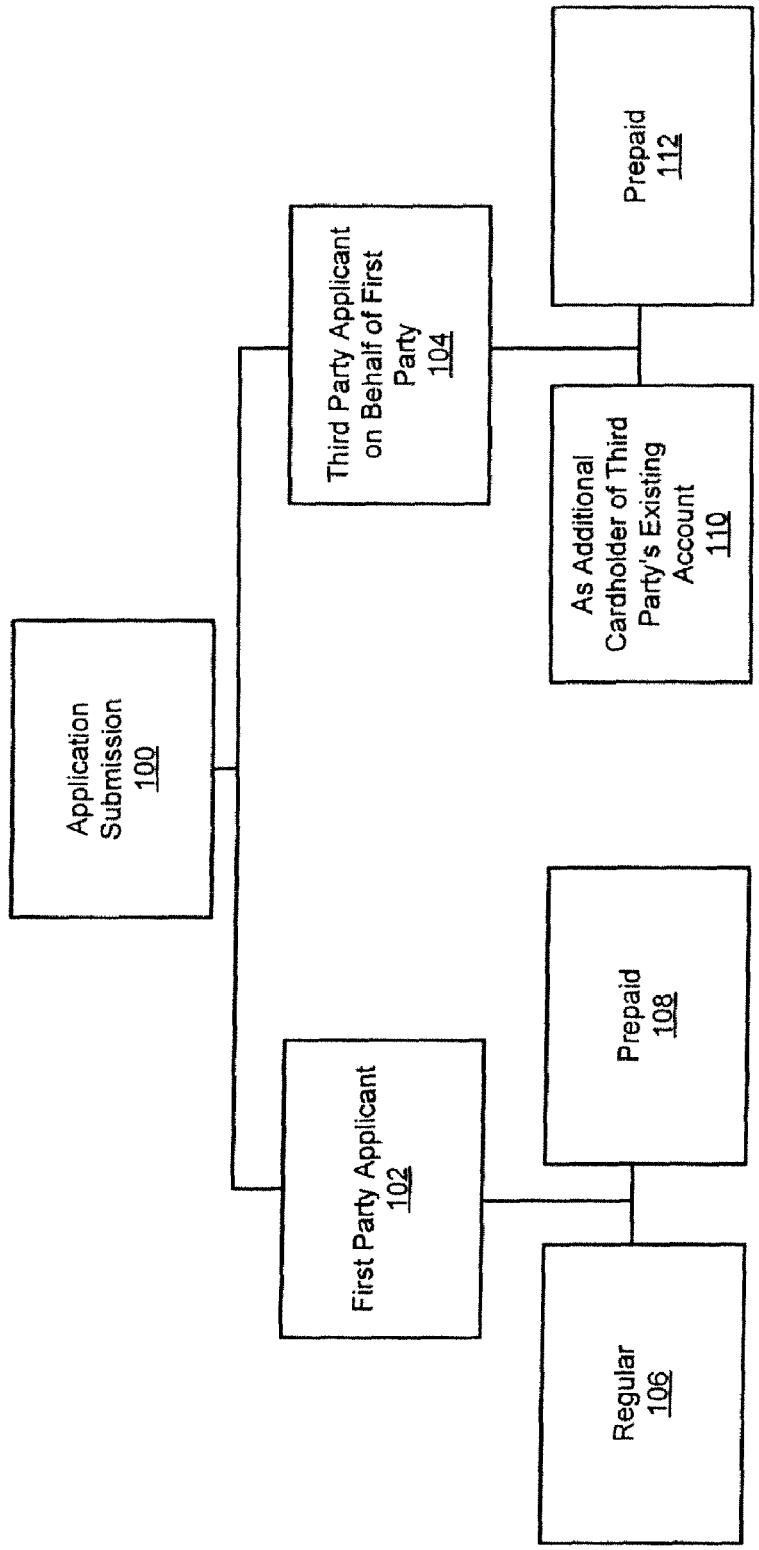

FIG. 2A is a block diagram illustrating alternative methods for implementing some embodiments over a network. As shown in FIG. 2A, an application for a wedding card may be submitted to a financial institution by a first party 102 or by a third party 104 on behalf of the first party. The first party could be at least one person from a couple, such as a future bride or groom, who intends to use the wedding card. The third party could be anyone assisting the couple in the arrangements for the wedding, such as a wedding planner, a company, a family member, or a friend of the couple. In some embodiments, the application for the wedding card may request the location of the wedding so that the wedding management system can provide a list of merchants/vendors and services in that particular location.

In the first case, when a first party 102 submits an application 100 for a credit/debit wedding card, e.g., a credit card application, a provider will either approve or deny the application, based on pre-established credit approval policies. If first party's 102 application is approved, then the first party can be issued a regular wedding card 106. On the other hand, if the first party's 102 application is denied, the first party 102 may not be authorized a wedding card. Alternatively, if a first party applicant has little or no credit or is denied the wedding card, the first party may request a prepaid wedding card 108 by providing funds to the provider. A prepaid wedding card 108 may then be issued for the amount of money provided by the first party applicant, less any fees. Notwithstanding the absence of a line of credit, a prepaid wedding card cardholder is entitled to the same benefits as a wedding card cardholder. At a future point, the backing financial institution may offer to extend a line of credit to the first party based on the spending habits and/or other criteria of the person/couple.

In the second case, if a future bride or groom (first party) has neither established credit nor funds, or for some other reason wishes not to apply for a credit/debit card, a third party may apply on behalf of the first party 104. If the third party 104 is a cardholder of another credit/debit card affiliated with the wedding card provider, the third party 104 may choose to add the first party 102 to his or her account as an additional cardholder 110. The third party 104 may request the provider to issue a wedding card 110 to the first party 102 in view of the pending nuptials. If, however, the third party 104 is not a card holder of an affiliated card, or would rather not add the first party 102 as an additional cardholder on his or her account, the third party 104 may apply for a prepaid card 112 on behalf of the first party 102. For example, the third party 104 would provide funds to the financial institution for the prepaid card 112, and a card would then be issued for the amount of the funds less any fees. Notwithstanding the absence of a line of credit, a prepaid wedding card cardholder is entitled to the same benefits as a wedding card cardholder. Additional monies could be added to the account, thereby increasing or extending the line of the account. At a future point, the backing financial institution may offer to extend a line of credit to the first party based on the spending habits and/or other criteria of the person/couple.

Although not shown in the flow chart of FIG. 2A, it is within the scope of the invention for the first party to be contacted to verify a region in which the wedding will be held when a third party applies for a wedding card on behalf of the first party.

As shown in the exemplary embodiment of FIG. 2B, a wedding card can be issued 120 to cardholder. The card will optionally be aesthetically pleasing. The card may be black and white, for example, and may be embossed with a choice of designs. Alternatively, the cardholder may choose to special order a card in a color or colors and/or pattern to match or compliment the wedding colors. In this case, a choice of design may still be embossed on the card.

FIG. 2B provides a block diagram illustrating an exemplary method for carrying out some embodiments of the present invention. After the wedding card has been issued, the wedding card cardholder may be offered a wedding planner 122, full access to all features of the wedding card website 124, and an individual code number 125 (further described below). The wedding planner 122 and wedding card website 124 can provide a 24-hour hotline 128 and contact information for wedding resources 130, which allows the wedding card holder to obtain goods and services 136. The wedding planner and wedding card website can also assist the couple in choosing and mailing both invitations 144 and Thank You Notes 146. In addition, the wedding card website provides the ability to create a personal wedding card website 132 that allows friends and family access to the personal wedding site 138.

Further, after the individual code 125 has been issued to the couple, the individual can provide the code number to friends and family members 134. The code number allows friends and family members the ability to transfer reward points to the wedding card 138. In addition, the friends and family members holding supplemental cards or affiliated cards may transfer reward points to the wedding card holders. As noted, FIG. 2B is an exemplary embodiments and other embodiments relating to FIG. 2B are described herein.

Once the wedding card has been issued 120, the wedding card cardholder may be offered the wedding planner 122 and/or full access to all features of the wedding card website 124. In some embodiments, the first party may be associated with the wedding card website 124 prior to applying for and being issued a wedding credit card. For example, the first party may have a personal account with the wedding card website 124. The first party may become aware of the wedding card and initiate the application process through a popup window initiated by the wedding card website 124 or through an advertisement via the website.

In some embodiments, a wedding management system may provide the wedding planner 122 at the time the wedding card is issued. Therefore, if the wedding card cardholder cannot, or would rather not, access the wedding card website 124, the card holder may still enjoy many of the features provided by the website. The wedding planner 122 may include instructions for accessing and using the wedding card website 124, as well as instructions for creating a personal wedding website 132. The wedding planner 122 can provide a list of preparations to be completed and a timeline for completing such preparations, both of which may also be found on the wedding card website 124. The list and timeline may be based on a wedding date, which can be provided to the wedding card provider via the website or the wedding card application. Further, the wedding planner provides lists and contact information of merchants/vendors of wedding related goods and services for the particular region. Further, the wedding planner may also include lists and contact information of possible reception halls (e.g., volunteer fire departments, lodges, restaurants, hotels), airports, hotels, and other pertinent information for the particular region.

The wedding planner 122 can be prepared with resources and information about the region where the wedding is to be held. In some embodiments, the wedding planner 122 is a hard copy version of static features of the wedding card website 124, based on the particular region in which the wedding is to be held. In some embodiments, prior to issuance of a wedding card, an applicant can select a geographical region to allow for preparation of the wedding planner. The wedding planner 122 may provide contact information for wedding merchants/vendors, such as caterers, bakeries, dress makers, photographers, disc jockeys, bands, reception halls, etc. for the selected region.

Alternatively, all matters of wedding planning and preparation may be carried out through the wedding card website 124. For example, in some embodiments, the website 124 includes an interactive wedding planner, which provides a list of preparations to be completed and a timeline for completing such preparations, based on a wedding date provided by the user. The website 124 may further include features or links to features to show when preparations should be completed. For example, wedding invitations 144 may be ordered, purchased, printed, addressed, and scheduled for delivery through the website 124. The invitations may be addressed by a printer associated with the website, and may be delivered to the intended recipients directly through the website 124. If the future bride/groom wishes to sign the invitations personally, the invitations may be printed, individually addressed, and delivered to the bride/groom for signing and mailing. After the wedding, thank you notes may be generated in the same manner, with a provision for entering a personalized message for the intended recipient of each thank you note.

In some embodiments, a wedding card cardholder may select a region on the website 124 in which the wedding is to be held after being issued a wedding card. Then, the website 124 may be updated to provide access to wedding vendors for the selected region. Access to the vendors may be provided by links or lists on the website 124. If a vendor has a website, a link to the vendor's website may be provided.

The wedding planner 122 and website 124 may provide lists or links for jewelers to facilitate purchasing rings. These jewelers can be located near the locality of the cardholders and do not depend on the selected region of the wedding. Further, travel and lodging lists or links may be provided to accommodate out of town guests. Furthermore, limousine companies and honeymoon related resources, such as travel agencies, airlines, hotels, etc. for other regions, may also be provided in the wedding planner 122 or on the wedding card website 124.

In some embodiments, both the wedding planner 122 and wedding card website 124 may include card-related information, such as regulations for earning and redeeming reward points and how reward points may be transferred.

The provider may provide a wedding card 106, 108, 110, or 112 having a rewards system and access to a total wedding management system. The rewards system may include a method and system for providing reward points. For example, these reward points can be based on the cardholder's purchases at affiliated merchants, the amount spent at a merchant, or any other means. The purchases may or may not be wedding-related to earn reward points. In some embodiments, for some or all wedding related purchases made through the website 124 using the wedding card, a pre-negotiated discount may be applied by the provider or the particular vendor. In addition, third-parties having credit cards issued through the same financial provider, or, for example, in some other way affiliated with the wedding card, may donate their current and/or any amount of future points to the wedding card of the first party. For example, the wedding card cardholder can be issued a code number 125. This code number can be provided to friends and/or family members 134. Any time a friend or family member makes a purchase with an affiliated card, the third party purchaser may donate points associated with that purchase to the wedding card by, for example, providing the merchant with the code number 134 issued to the wedding card cardholder, providing the card number via the website, or by writing directly to the issuing company. Furthermore, in some embodiments, anyone having authorization may add cash to a wedding card through an associated website. When the cardholder next logs onto the personal wedding website, he or she will be notified of the cash gift, who sent the gift, etc., and can be offered an opportunity to create a thank you note immediately.

Reward points may be redeemed by the cardholder for a multitude of goods and/or services, including, but not limited to, gift certificates, consumer products, dining, spa services, travel related services (such as airfare, lodging, cruises, e.g.), the honeymoon, entertainment (such as theater, opera, and concert tickets), and home improvement services, e.g., kitchen or bath remodeling, installation of new windows or siding, paving or lawn care services. Further, reward points can be used for post-wedding goods and/or services, including, but not limited to, furniture, clothes, dishes, items on registry list that were not gifted to the couple, etc. Furthermore, some or all of the points may be donated to the next lucky couple to obtain a wedding card, such as a guest that catches the bouquet, for example.

The wedding planner 122 may include planning and preparing details of the wedding such as a proposed wedding planning timeline, scheduling events, budgeting worksheet, contact information, guest contact information, catering information, flowers and decorating, registry worksheet, and honeymoon planner. The wedding planner may also include information regarding the wedding card website 124, such as how and where to access the website and how to utilize various features of the website. In some embodiments, the wedding planner 122 and its wedding details may be used in combination with the wedding card website 124 or be located on the wedding card website 124 exclusively. The wedding planner 122 and website 124 may have advertisements and wedding related goods and services, which may be purchased through the contact information 130 provided in the planner 122 and website 124. In some embodiments, based on the geographic region specified in the wedding card application or the personal information, such as the location of the wedding, stored on the website, the wedding planner and website can provide contact information 130 for merchants/vendors, facilities, wedding related services, etc., for at least the region in which the wedding is to be held.

The wedding planner 122 and the wedding card website 124 may include a 24-hour hotline 128, whereby operators may be contacted for wedding planning assistance. The 24-hour hotline 128 may also be used to obtain assistance related to the wedding card and/or website.

The wedding card website 124 includes provisions for creating a personal wedding website 132. The future bride or groom may create a personal wedding website 132 or other network website through the wedding card website 124. Friends and family may access the personal wedding website through the Internet 138, for example. The personal wedding website 138 may include logistical details about the wedding, such as the date, the time, and the location of the wedding and reception. Maps and directions to the wedding and reception locations may be provided or generated by the personal wedding website, or through a link on the personal wedding website. Further, lodging information and local attractions may be provided for out of town guests. Furthermore, the personal wedding website 138 may include a webpage that provides photos that allows a couple to share their moments leading up to the wedding day and beyond.

The personal wedding website may further include a bridal registry that includes a gift list created by the future bride. Where appropriate, the list will be a linked list, and items on the list will be hyperlinked, for example, to a website or a list of websites where the item may be purchased. A discount may be applied or double points may be rewarded when a guest uses both the personal website and their affiliated credit/debit card to purchase wedding gifts. For example, for all purchasing activity performed through the personal website, the wedding card may be rewarded points. If a purchaser uses an affiliated credit card to purchase gifts, the purchaser may be rewarded points in the usual manner for the affiliated card. The purchaser may choose to donate the points to the wedding card cardholder by entering the previously issued code number.

A cardholder may choose to include a website address, such as a Universal Resource Locator (URL), for the personal wedding website in the wedding invitations 144. The website may further serve to notify guests that reward points earned on credit cards that are affiliated with the wedding card may be donated 138, 140 to the couple by purchasing through the personal wedding website, or, when purchasing elsewhere, by using the individual code, or by writing to the issuer for example. Therefore, the cardholder may wish to provide the individual code to friends and family 134. In some embodiments, the individual code may be safely posted on the wedding website because no personal data can be obtained from the individual code number.

After the wedding, the newlyweds may select to update the personal wedding website 124 with photographs and/or video of the ceremony, reception, and/or honeymoon. The personal wedding website 124 may include a "photo album," by which photographs of people and events leading up to the wedding may be displayed over the network 138. Photograph files may be uploaded from a digital camera, a recording medium such as a CD ROM, a scanner, etc., and published on the personal wedding website in the "photo album." After the wedding, photographs of the wedding may similarly be displayed, as may photographs of the honeymoon, etc. Photographs may also, for example, be downloaded for free, or for a fee. In addition, video of the wedding and/or reception may also be published on the website. Photos, videos, and/or voice recordings may also be posted to the site during the event so that family and friends who could not come can participate remotely.

In some embodiments, a book illustrating the history of the wedding may be sent to the user by the wedding management system, in which a time line of the wedding, from receipt of the wedding card to the expiration thereof, is set forth through, for example, text, illustrations, photographs, charts, and memorabilia.

Finally, although not shown in the block diagrams of FIGS. 2A and 2B, it is within the scope of the invention that, after the predetermined lifetime of the wedding card expires, a photograph album for displaying the expired card may be sent to the cardholder, and the wedding card may be converted to a post-wedding credit card. Or alternatively at the end of the lifetime of the card, a keepsake frame may be given to the cardholder by the card provider, in which the card and other wedding memorabilia, such as photos, etc., may be displayed.

The wedding card can be converted to a post-wedding card (e.g. a new type of credit card or a typical credit card) a predetermined amount of time after the wedding, at the time of the wedding, at a random time, or a predetermined amount of time after being issued. Reward points remaining on the wedding card are transferred to the post-wedding credit card at the end of the lifetime of the wedding card. Conversion to the post-wedding credit card is at the discretion of the provider, and may depend, for example, on expenditure and payment history of the wedding card cardholder during the lifetime of the card. In some embodiments, if however, at the end of the lifetime of the wedding card, no post-wedding credit card is to be issued, any reward points accrued to the wedding card remain available to the cardholder until the points are redeemed.

Figure 3:
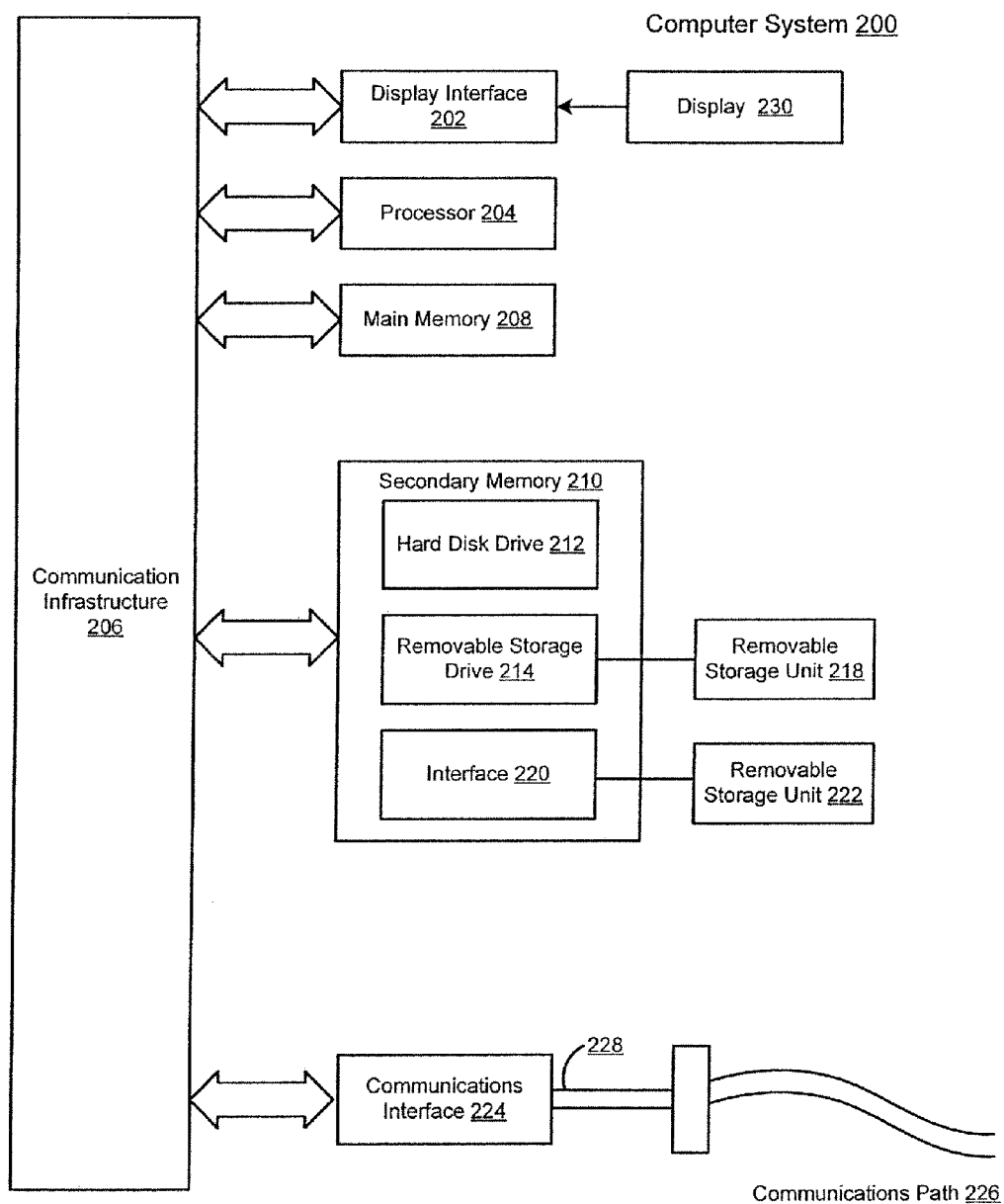
FIG. 3 is a block diagram illustrating an exemplary computer system for implementing some embodiments of the present invention.

The present invention may be implemented using hardware, software, or a combination thereof and may be implemented in one or more computer systems or other processing systems. In some embodiments, the invention is directed toward one or more computer systems capable of carrying out the functionality described herein. An example of such a computer system is shown in FIG. 3.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to one of ordinary skill in the art how to implement the invention using other computer systems and/or architectures.

Computer system 200 can include a display interface 202 that forwards graphics, text, and other display data from the communication infrastructure 206 (or from a frame buffer not shown) to display unit 230. Computer system 200 may also include a main memory 208, such as a random access memory (RAM), and may also include a secondary memory 210. Secondary memory 210 may include, for example, a hard disk drive 212 and/or a removable storage drive 214, representing a floppy disk drive, a magnetic tape drive, an optical disk drive, etc. Removable storage drive 214 reads from and/or writes to a removable storage unit 218 in a well-known manner. For example, removable storage unit 218 can represent a floppy disk, a magnetic tape, an optical disk, etc. As will be appreciated, the removable storage unit 218 may include a computer usable storage medium that stores computer software and/or data.

In some embodiments, secondary memory 210 may include an interface 220 that connects to a removable storage unit 222 or other similar devices for allowing computer programs or instructions to be loaded into computer system 200. An exemplary removable storage unit 222 and interface 220 can include a program cartridge and cartridge interface (such as that found in video game devices), a removable memory chip (such as an erasable programmable read only memory (EPROM), or programmable read only memory (PROM)) and its associated socket.

Computer system 200 may also include a communications interface 224. Communications interface 224 allows software and data to be transferred between computer system 200 and external devices. Examples of communications interface 224 may include a modem, a network interface (such as an Ethernet card or wireless network adapter), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via communications path (e.g., channel) 226. This path 226 carries signals 228 and may be implemented using wires or cables, fiber optics, telephone lines, cellular links, radio frequency (RF) links, Bluetooth, and/or other communication channels. In this document, the terms "computer program medium" and "computer usable medium" can be used to refer generally to media having a storage device such as a removable storage drive 214, a hard disk installed in hard disk drive 212, removable storage unit 218 and, removable storage device 222. These computer program products have the ability to provide software to the computer system 200.

Computer programs (also referred to as computer control logic) can be stored in main memory 208, secondary memory 210, removable storage unit 218 and/or removable storage unit 222. Computer programs may also be received via communications interlace 224. Such computer programs, when executed, enable the computer system 200 to perform the embodiments provided herein.

In some embodiments, where the invention is implemented using software, the software may be stored in a computer program product and loaded into computer system 200 through the removable storage drive 214, the hard drive 212, the interface 220, or the communications interface 224. The control logic (software), when executed by the processor 204, can cause the processor 204 to perform the functions of the invention as described herein. In some embodiments, the invention is implemented primarily in hardware using, for example, hardware components, such as application specific integrated circuits (ASICs). Implementation of the hardware state machine so as to perform the functions described herein will be apparent to persons skilled in the relevant art(s).

In some embodiments, the invention can be implemented using a combination of both hardware and software.

Figure 4:
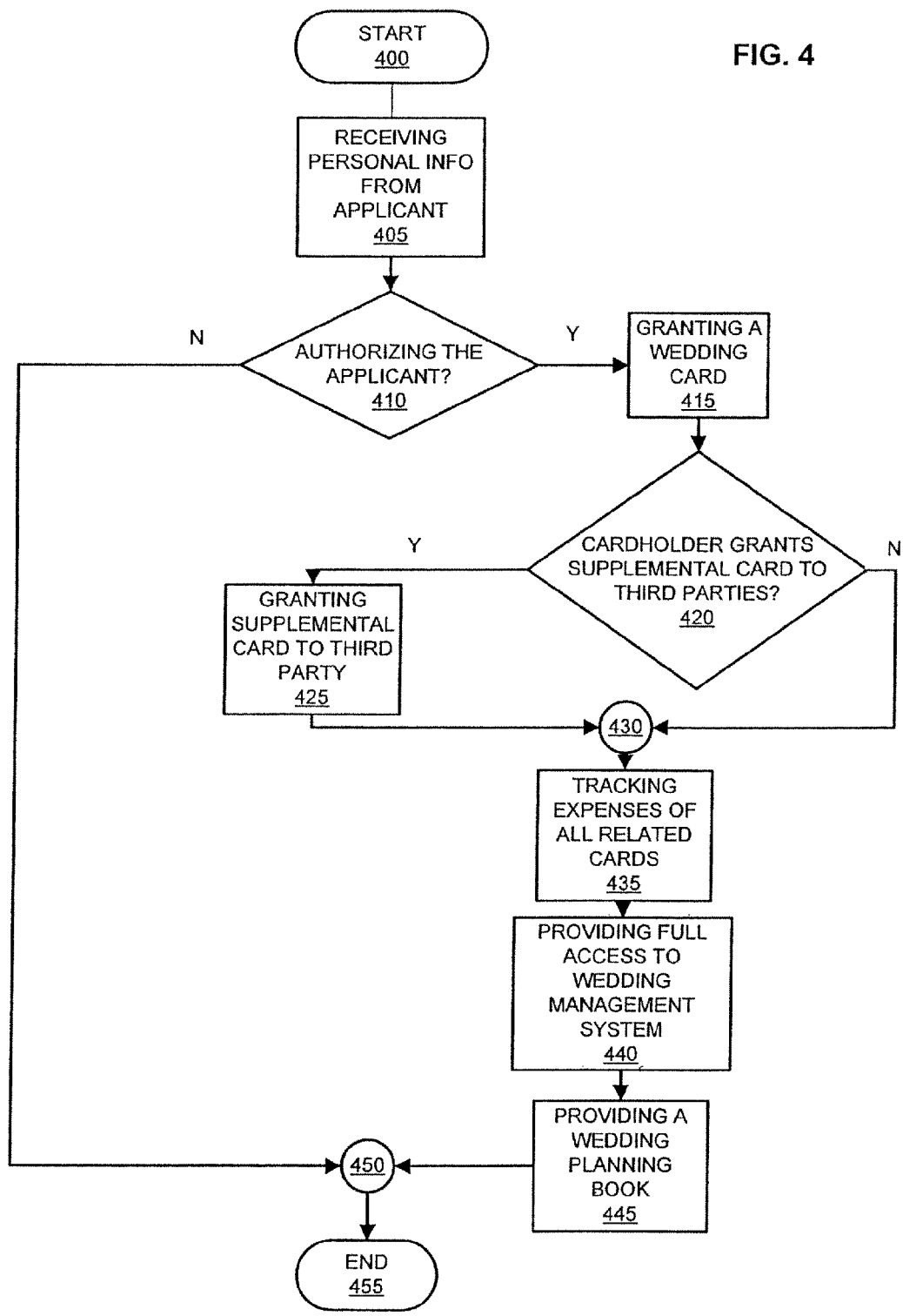
FIG. 4 is a flowchart representing an exemplary method for providing a wedding card and its wedding management system to a user.

FIG. 4 is a flowchart representing an exemplary method for providing a wedding card and its wedding management system to a user. It will be readily appreciated by one of ordinary skill in the art that the illustrated procedure can be altered to delete steps or further include additional steps. After initial start step 400, the wedding management system receives personal information from an applicant 405. The applicant can be the potential bride and/or groom or a third party applying for the potential bride/groom and the personal information could be the personal information of the bride/groom and/or third party.

After receiving the personal information from the applicant, the wedding management system can determine whether to authorize the applicant 410 based on the applicant's credit history, etc. If the wedding management system does not authorize the applicant, the method can proceed to connector 450. Otherwise, if the wedding management system authorizes the applicant, the wedding management system can grant a wedding card 415.

After the applicant has been granted a wedding card, a cardholder has the option to grant a supplemental wedding card to a third-party 420. For example, the third-party can be anyone assisting the bride/groom with the wedding, such as friends and/or family members. If the cardholder decides not to grant a supplemental card to any third party, the method can proceed to connector 430. On the other hand, if the user decides to grant a supplemental card to one or more third-parties, the cardholder may fill out any necessary forms and the wedding management system can grant the supplemental card to the third-party 425.

After the wedding management system grants a supplemental card to the third-party, the wedding management system may track the expenses of all related wedding cards 435. For example, the bride and groom may each have expenses from their own wedding cards. Additionally, any expenses from one or more supplemental wedding card issued to a third party can be tracked. This allows the cardholder to monitor expenses for the wedding from the wedding card cardholder's account.

After the wedding management system tracks the expenses of all related wedding cards, the wedding management system may provide full access to a web-based wedding management system 440. In some embodiments, the full access to the wedding management system can be provided at any point after the wedding management system authorizes the applicant at step 410. For example, prior to having full access, the wedding card cardholder could have limited access to the website of the wedding management system. As shown above in the description of FIGS. 2A and 2B, full access to the wedding management system allows the cardholder to better manage and plan their wedding.

After full access to the wedding management system has been provided, the wedding management system can provide a wedding planner to the cardholder 445. As shown above in the description of FIGS. 2A and 2B, the wedding planner provides the cardholders the ability to better manage and plan their wedding. In some embodiments, the wedding planner can be provided at any point after the authorization of the user at step 410. In some embodiments, the wedding planner can be provided either before or after the cardholder is provided full access to the wedding management system. Once the wedding plan book has been provided to the cardholder, the flowchart can proceed to connector 450 and then end 455.

Figure 5:
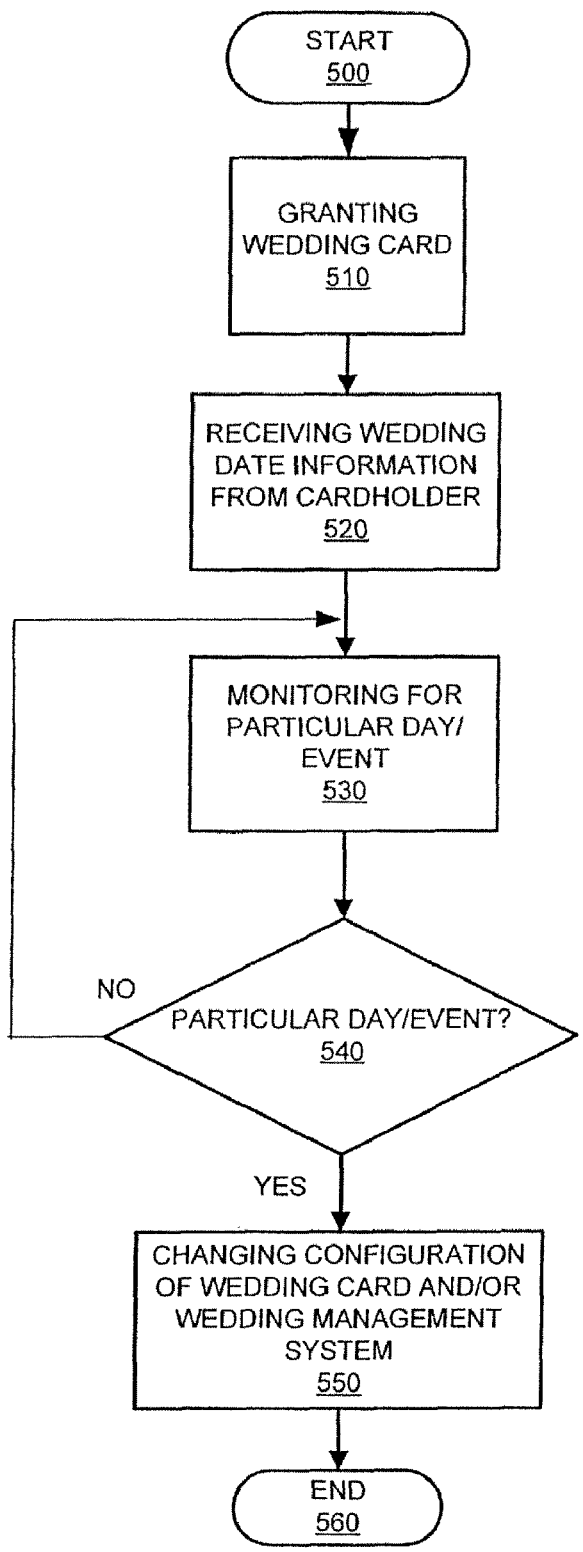
FIG. 5 is a flowchart representing an exemplary method for changing a configuration of the wedding card based on a triggered event.

FIG. 5 is a flowchart representing an exemplary method for changing a configuration of the wedding card and/or wedding management system based on a triggered event. It will be readily appreciated by one of ordinary skill in the art that the illustrated procedure can be altered to delete steps or further include additional steps. For this exemplary method, it is assumed that the cardholder has provided personal information to the wedding management system and the wedding management system has authorized the cardholder to be granted a wedding card. After the initial start step 500, the wedding management system may grant a wedding card to a cardholder 510.

After the cardholder is granted a wedding card, the cardholder has the option of providing the wedding date to the wedding management system 520. This allows the wedding management system to assist the cardholder in planning and managing the wedding. In some embodiments, the cardholder may have provided the wedding date during the wedding card application process, which would be prior to the granting of the wedding card at step 510. Alternatively, the cardholder may have provided the wedding date at the wedding card website.

As a result of receiving the wedding date information, the wedding management system can monitor the dates with reference to the wedding date at step 530. In some embodiments, this allows the wedding management system to assist cardholders to plan and manage their wedding. Additionally, the monitoring of dates can continue until after the wedding. For example, it is acceptable for friends and families to send cards and gifts to the married couple up to one year after the wedding date. Thus, the wedding management system may establish a particular date within its data storage device and monitor the dates up until the particular date, whether the particular date is the wedding day, a date being a predetermined time (e.g. a year) after the wedding day, or a random date. In some embodiments, the particular date may depend on the credit history or if the cardholders have made their payments in time.

The wedding management system determines whether the particular day has arrived 540. If the particular date has not arrived, the wedding management system continues to monitor the date at step 530. Otherwise, if the particular day has arrived, the wedding management system has the ability to change the configuration of the wedding card and/or wedding management system. For example, the married couple may not be able to accumulate reward points relating to the wedding, or third parties may not have the ability to gift reward points to the married couple. In some embodiments, the wedding management system may alter the web page and/or provide a second post-wedding planner or web pages to provide information to help the married couple to start and manage a life together. For example, the web page and/or second post-wedding planner may include ways for the couple to connect, merge items into one space, set a budget, provide approved marriage counselors for the couple, provide advice for romance and vacations, provide recipes that you both enjoy, and provide a housework worksheet creating a to-do list for the couple. In addition, the altered wedding management system may have different affiliated vendors from the vendors associated with the wedding card. For example, instead of having a caterer being an affiliated vendor, the affiliated vendor might be Home Depot or Restoration Hardware. After the configuration has changed for the wedding card and/or the wedding management system, the method can end 560.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one website or distributed across multiple sites and interconnected by a communication network.

Other embodiments of the invention may be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
receiving personal information concerning a user;
determining whether to authorize the user based on the personal information;
granting a wedding card to the user based on the determination to authorize the user, wherein the wedding card is associated with a wedding of the user;
changing, at a database, properties of the wedding card based on the occurrence of a particular date, such that the properties of the wedding card are converted to post-wedding credit card properties.

2. The method of claim 1, wherein the wedding card is affiliated with a plurality of vendors, and after the particular date one or more of the vendors affiliated with the wedding credit card change based on the occurrence of the particular date.

3. The method of claim 2, further comprising providing reward points to the wedding card when the user purchases a good or service from an affiliated vendor.

4. The method of claim 1 wherein the receiving personal information concerning a user is from a third party other than the user.

5. The method of claim 1 further comprising providing the user with reward points for making purchases with the wedding card.

6. The method of claim 5 further comprising associating a third party's credit card with the wedding card, wherein the third party may donate reward points associated with the third party's credit card to the wedding card and the third party is someone other than the user.

7. The method of claim 6, wherein the third party automatically donates reward points associated with the third party's credit card by providing a code to the merchant while making a purchase with third party's credit card.

8. The method of claim 1, wherein the wedding card has different features based on a particular date related to the wedding date.

9. The method of claim 8, wherein the particular date is a predetermined time after the user's wedding date.

10. The method of claim 1, further comprising:
providing access to a website for the user, wherein the website provides a wedding management system assisting the user in planning the wedding; and
providing the user with reward points when the user uses the wedding card to purchase a good or a service on the website.

11. A non-transient computer readable medium including instructions, which if executed by a computing system, causes the computing system to perform a method, the method comprising:
receiving personal information concerning a user;
determining whether to authorize the user based on the personal information;
granting a wedding card to the user based on the determination to authorize the user, wherein the wedding card is associated with a wedding of the user;
changing, at a database, properties of the wedding card based on the occurrence of a particular date, such that the properties of the wedding card are converted to post-wedding credit card properties.

12. The computer readable medium of claim 11, wherein the wedding card is affiliated with a plurality of vendors, and after the particular date one or more of the vendors affiliated with the wedding credit card change based on the occurrence of the particular date.

13. The computer readable medium of claim 12, further comprising providing reward points to the wedding card when the user purchases a good or service from an affiliated vendor.

14. The computer readable medium of claim 11, wherein the receiving personal information concerning a user is from a third party other than the user.

15. The computer readable medium of claim 11, further comprising providing the user with reward points for making purchases with the wedding card.

16. The computer readable medium of claim 15, further comprising associating a third party's credit card with the wedding card, wherein the third party may donate reward points associated with the third party's credit card to the wedding card and the third party is someone other than the user.

17. The computer readable medium of claim 16, wherein the third party automatically donates reward points associated with the third party's credit card by providing a code to the merchant while making a purchase with third party's credit card.

18. The computer readable medium of claim 11, wherein the wedding card has different features based on a particular date related to the wedding date.

19. The computer readable medium of claim 18, wherein the particular date is a predetermined time after the user's wedding date.

20. The computer readable medium of claim 11, further comprising:
providing access to a website for the user, wherein the website provides a wedding management system assisting the user in planning the wedding; and
providing the user with reward points when the user uses the wedding card to purchase a good or a service on the website.

21. A non-transient computer readable medium including instructions, which if executed by a computing system, causes the computing system to perform a method, the method comprising:
receiving personal information concerning at least one person of a couple preparing to be married;
determining whether to authorize the at least one person of the couple based on the personal information of the at least one person of the couple;
granting a first wedding card to the at least one person of the couple based on the determination to authorize the at least one person of the couple, wherein the first wedding card is converted to a post-wedding credit card based on a particular date;
granting a supplemental wedding card to a third party, wherein the supplemental wedding card is associated with the first wedding card and the third party is a person other than the couple that is assisting the couple in the marriage preparations; and
tracking the expenses of an account using a database, wherein the account is associated with the marriage preparations from both the first wedding card and the supplemental wedding card.

22. The computer readable medium of claim 21, wherein the receiving personal information concerning the person is from a third party other than the couple.

23. The computer readable medium of claim 21, further comprising providing the person with reward points for making purchases with the wedding card.

24. The computer readable medium of claim 23, further comprising associating a third party's credit card with the wedding card, wherein the third party may donate reward points associated with the third party's credit card to the first wedding card.

25. The computer readable medium of claim 24, wherein the third party donates reward points associated with the third party's credit card by providing a code to the merchant while making a purchase with third party's credit card.

26. The computer readable medium of claim 24, wherein the third party donates reward points associated with the third party's credit card to the user via a wedding card website.

27. The computer readable medium of claim 24, wherein the third party's credit card is the supplemental wedding card.

28. The computer readable medium of claim 21, wherein the first wedding card has different features based on a particular date related to the wedding date.

29. The computer readable medium of claim 28, wherein the particular date is a predetermined time after the person's wedding date.

30. The computer readable medium of claim 21, further comprising rewarding the person when the person uses the first wedding card to purchase an item on a website associated with the wedding management system.

31. The method of claim 21, wherein the reward is additional reward points or a discount in price for the item.

32. The computer readable medium of claim 21, further comprising allowing a third party to provide a cash gift to the person through the website by crediting the first wedding card.

33. A non-transient computer readable medium including instructions, which if executed by a computing system, causes the computing system to perform a method, the method comprising:
receiving wedding date information associated with a wedding of a user;
monitoring the time to determine if a triggering event has occurred, wherein the triggering event corresponds to a particular date related to the wedding date information; and
changing, at a database, properties of a wedding card based on the occurrence of the triggering event, wherein the wedding card is associated with the wedding of the user.

34. The computer readable medium of claim 33, wherein the particular date is a predetermined time after the one or more user's wedding date.

35. The computer readable medium of claim 33, further comprising changing properties of a website associated with the wedding card based on the triggering event.

36. A non-transient computer readable medium including instructions, which if executed by a computing system, causes the computing system to perform a method, the method comprising:
receiving personal information concerning a user, wherein the user is preparing for a wedding;
determining whether to authorize the user based on the personal information;
granting a wedding card to the user based on the determination to authorize the user, wherein the wedding card is associated with the wedding of the user;
receiving a wedding date information associated with the wedding;
monitoring the time to determine if a triggering event has occurred, wherein the triggering event corresponds to a particular date related to the wedding date; and
changing, at a database, properties of the wedding card based on the occurrence of the triggering event.

37. The computer readable medium of claim 36, wherein the receiving personal information concerning a user is from a third party.

38. The computer readable medium of claim 36, wherein the particular date is a predetermined time after the one or more user's wedding date.

39. The computer readable medium of claim 36, further comprising changing properties of a website associated with the wedding card based on the triggering event.

40. A non-transient computer readable medium including instructions, which if executed by a computing system, causes the computing system to perform a method, the method comprising:

associating a wedding card with a wedding management system, wherein the wedding card is associated with a wedding of the user and wherein the wedding card is converted to a post-wedding credit card based on a particular date; and;

providing a user access to a website associated with the wedding management system, wherein the website assists the user in planning the wedding.

41. The computer readable medium of claim 40, further comprising discounting the price of a good or service of an affiliated vendor when the user purchases the good or service from the website associated with wedding management system.

42. The computer readable medium of claim 41, further comprising providing reward points to the wedding card when the user purchases a good or service from an affiliated vendor.

* * * * *